Nov. 14, 1939.                T. W. ROLPH                    2,179,862
         REFLECTING BRICK AND WALLS AND BUILDINGS UTILIZING THE SAME
                     Filed Aug. 25, 1933          2 Sheets-Sheet 1

INVENTOR.
THOMAS W. ROLPH
BY
ATTORNEY.

Nov. 14, 1939.  T. W. ROLPH  2,179,862
REFLECTING BRICK AND WALLS AND BUILDINGS UTILIZING THE SAME
Filed Aug. 25, 1933   2 Sheets-Sheet 2

INVENTOR.
THOMAS W. ROLPH
BY
ATTORNEY.

Patented Nov. 14, 1939

2,179,862

UNITED STATES PATENT OFFICE 2,179,862

REFLECTING BRICK AND WALLS AND BUILDINGS UTILIZING THE SAME

Thomas W. Rolph, Newark, Ohio, assignor to Holophane Company, Inc., New York, N. Y., a corporation of Delaware Application August 25, 1933, Serial No. 686,740

16 Claims. (Cl. 88—60)

The present invention relates to reflecting brick and walls and buildings utilizing the same.

To provide translucent walls in building construction it has heretofore been proposed to utilize bricks made out of glass or other transparent or translucent material. These are generally made in the form of more or less box-shaped glass articles having five sides, and are used alone or with a closure or cover member to make a six sided brick. These glass bricks were pressed or molded out of glass, more or less diffusing, depending upon the manner in which the bricks were formed.

Building walls made out of these translucent bricks have the advantage of transmitting light in or out, so as to employ natural light for interior lighting, or to produce a luminous effect for the building wall when the interior is lighted artificially at night. When these translucent walls are used for lighting interiors from outdoor light, the light received comes from the sky and the light transmitted is placed on the floor or in the lower regions of the room. Hence the brightest part of the room is at the floor close to the walls so that the general distribution of light is frequently unsatisfactory, and the brightness of the walls as viewed by the occupants is very great. Such lighting is unnatural and difficult to work with.

An object of the present invention is to redistribute this natural outdoor light by reflecting it in its passage through the brick wall so that the light is emitted from the inside of the building wall at higher angles, preferably at angles above the horizontal, whereby it is directed toward the ceiling of the room or toward the upper opposite wall of the room. In this manner the natural light is employed in a manner more acceptable to the eye. This redirection of light will give a bright ceiling with the brightness of the inner surfaces of the outer wall as viewed by an occupant of the room reduced sufficiently to make vision comfortable. The general effect will be that of indirect lighting with some direct component of light coming from the wall itself.

According to the present invention, the bricks may be made up in various forms and be provided with a reflecting medium on a horizontal or substantially horizontal surface. This reflecting medium may be prismatic or may be in the form of a layer of reflecting glass, such as opal glass, or one may use a reflector such as a glass or metal plate. The light passes through the outside vertical wall of the brick, falls on this reflecting medium, and is then sent upwardly and inwardly either through the opposite or inner wall of the brick, or through a side wall cover where an inwardly opening five-sided brick is employed.

The accompanying drawings show, for purposes of illustrating the present invention, several embodiments in which the invention may take form, it being understood that the drawings are illustrative of the invention rather than limiting the same. In these drawings.

Figure 1:
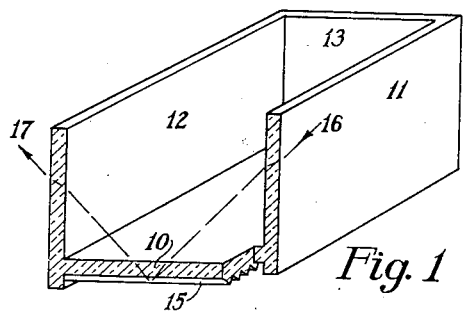
Fig. 1 is a perspective view of one form of translucent brick with parts in section in a transverse plane, and showing a brick employing transverse reflecting prisms.

For simplicity in the drawings, no showing is made of ledges, grooves, raised surfaces, or other formations on the tops and bottoms of the bricks to assist in securing cover plates or in laying the bricks in the wall.

It is contemplated that the bricks shown should be in the form of unitary pressed glass articles, of generally rectangular, box shape. They may be either pressed completely to shape at one time in the mold, or pressed flat and then folded to shape and fused at the corners. The five-sided brick may be used with or without a cover to form a six-sided brick.

In the form shown in Fig. 1, the brick has a bottom wall 10, side walls 11 and 12, and end walls, one of which is shown at 13. The lower surface of the bottom wall 10 is spaced some distance above the lower edges of the side and end walls to keep it away from the mortar. It is provided with transverse reflecting prisms indicated at 15. A ray of light entering from above the horizontal, as indicated at 16, is reflected by the prisms 15 so as to be emitted in an oblique upward direction, as indicated at 17.

Figure 2:
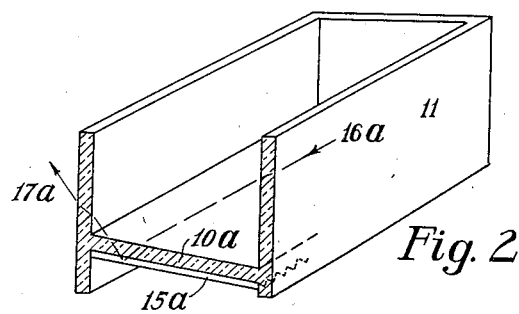
Figs. 2 and 3 are similar views of a brick employing transverse prisms,—Fig. 2 showing the reflecting surface tipped and Fig. 3 showing the reflecting surface tipped and curved.

In the form shown in Fig. 2, the substantially horizontal wall 10a is inclined or tipped so as to be lower on the incident side 11. Light entering at an angle such as indicated at 16a is reflected by prisms 15a at a higher angle 17a than that shown in Fig. 1. Turning the brick end for end will depress the angle of the emitted beam.

Figure 3:
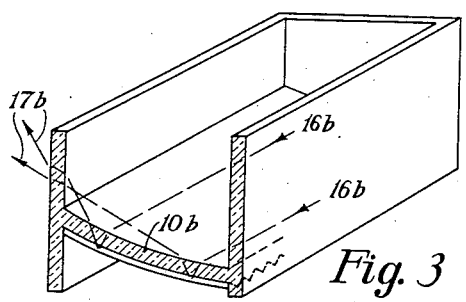

In the form shown in Fig. 3, the construction is substantially the same except that the bottom wall 10b is curved so as to vary the angle of emergence of rays 17b, so as to spread the emitted light.

Figure 4:
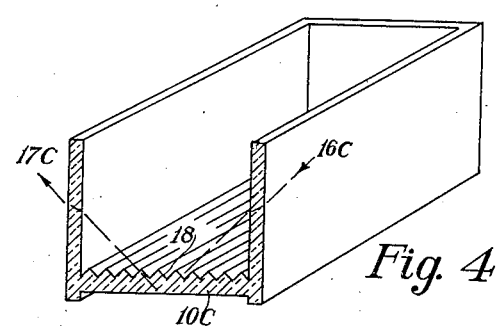
Fig. 4 is a view similar to Fig. 1 showing a brick having longitudinal reflecting prisms.

In the form shown in Fig. 4, the bottom wall 10c is provided with longitudinal prisms 18 on its upper surface. These prisms, in conjunction with the opposed smooth surface, act on incident light, such as shown at 16c, to reflect it upwardly as shown at 17c. The bottom wall 10c may be tipped or curved as shown in Figs. 2 and 3.

Figure 5:
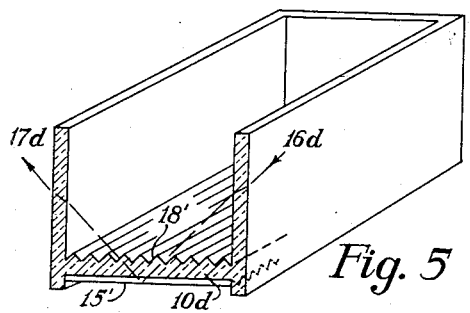
Figs. 5 and 5a are similar views showing a brick having both longitudinal and transverse prisms,—Fig. 5a showing the bottom wall tilted.
Figure 5A:
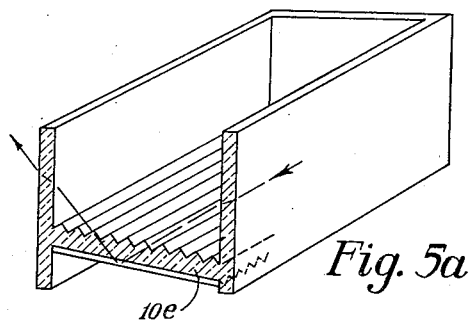

In the form shown in Fig. 5, the bottom wall 10d of the brick is provided with longitudinal reflecting prisms 18' on its upper surface and transverse reflecting prisms 15' on its lower surface. The path of the light rays is indicated at 16d, 17d. The bottom wall 10d may be tipped as indicated at 10e in Fig. 5a.

Figure 6:
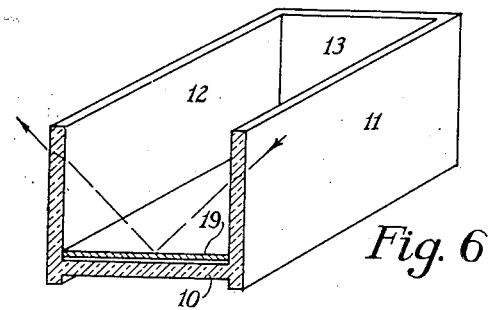
Figs. 6 and 6a are similar views showing brick provided with a non-prismatic reflecting medium.
Figure 6A:
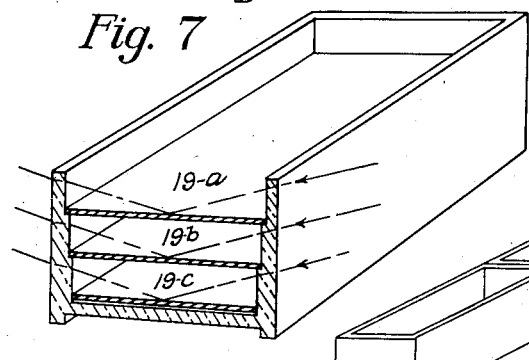

Fig. 6 shows a brick of the same general shape as Fig. 1. The upper surface of the bottom wall 10 of this brick supports a reflecting medium 19 which may be in the form of a metal or glass plate or other reflecting material, or may be in the form of a layer of opal glass flashed or cased onto the pressed glass. This reflecting plate may be of any shape and tipped at any angle. It may cover the entire bottom surface of the brick or it may cover only part of the surface to allow some light to go downward. It may be perforated if desired. The material used might be anything whatever. Paper, cardboard, opal glass, urea-formaldehyde, Celluloid, aluminum and many other opaque or translucent reflecting substances are possibilities. If the brick is too deep for proper handling of the light by a single reflecting surface, a series of reflecting plates 19a 19b and 19c may be used one above another, spaced apart vertically, as shown in Figure 6a.

This form of light direction may also be obtained from a silvered surface applied to the glass itself on the horizontal glass surface, or by the use of aluminum paint, white paint, or any other form of reflecting coating applied on either the inner or the outer surfaces of the horizontal wall or by an insert.

Figure 7:
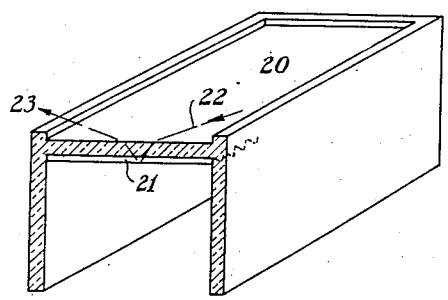
Figs. 7 and 7a are perspective views with parts in section showing a form of brick having a prismatic construction at the top and a building wall employing the same.
Figure 7A:
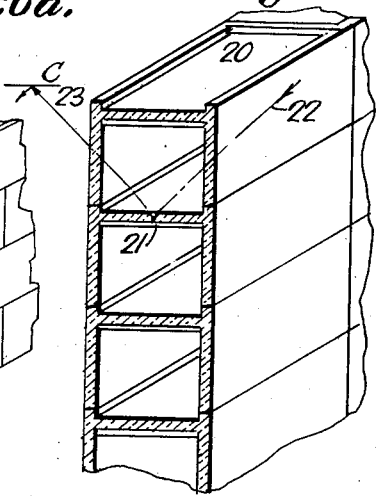

The form of brick shown in Figs. 7 and 7a has a horizontal wall 20 near the top. It may be tipped or curved, if desired. The lower surface of this wall is provided with transverse prisms 21. A light ray indicated at 22 passing through the superposed brick is reflected and emitted as indicated at 23 and strikes the ceiling C for redirection thereby.

It will be obvious that any of the constructions illustrated in Figs. 1–6a, inclusive, may be inverted so that the reflecting surface is at the top of the brick instead of at the bottom. In this inverted position, the reflecting prisms or material would be so placed as to act upon light rays transmitted by the brick above and reflect these light rays upward back through the brick above to the interior of the room. Such an arrangement might be preferred for reasons connected with the process of bricklaying.

Figure 8:
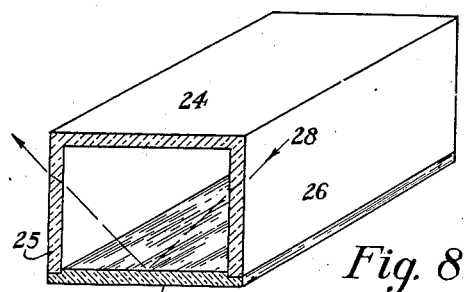
Fig. 8 is a perspective view of a six-sided brick showing a reflecting cover plate as the bottom side.

In the form shown in Fig. 8, the brick has a top wall 24, two side walls 25 and 26 and a cover plate 27 forming a bottom wall. This cover plate is made of a reflecting material so that it reflects light upward. For example, a light ray 28 entering in a downward direction through the outer wall 26 is reflected from the bottom cover 27 and passes through the wall 25 emerging in an upward direction. The bottom cover 27 may be made of any material which will reflect light. A preferred combination would be to make the brick proper of transparent or translucent glass while the bottom cover 27 is made of dense opal glass. This will reflect a large part of the light allowing a small amount to be transmitted for appearance reasons. The cover 27 may, however, be made of prismatic glass, mirrored glass, polished metal or any other reflecting material.

Figure 9:
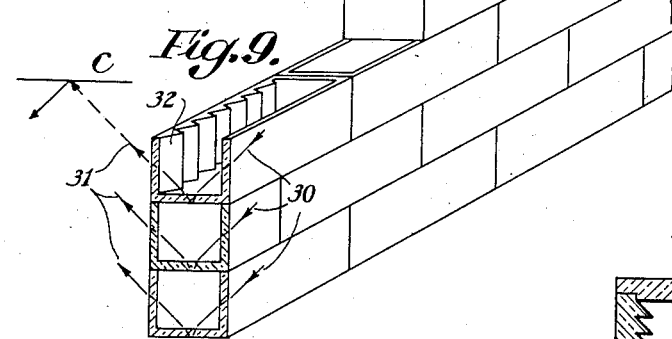
Fig. 9 is a perspective view through a wall built up out of bricks of the type herein shown and illustrates the redistribution of light by the ceiling.

A fragment of the wall is indicated in Fig. 9. It consists of a number of bricks such as shown in any of the preceding figures, placed on top of one another in the usual manner. Natural light coming from the sky in downwardly oblique directions as indicated at 30, enters an outer face of the brick wall, is reflected by the reflecting medium carried by the brick, and sent into the room in upwardly oblique directions, as indicated at 31. This light is, therefore, directed toward the ceiling C of the room so as to be redistributed by the ceiling in a manner analogous to indirect lighting by artificial light. Owing to the upward direction of this light, as viewed by the occupant of the room, the wall brightness is reduced to but a small amount of what it would be were the bricks of the ordinary type in which the light is transmitted with but slight diffusion and no redirection. This light control is not to be confused with prismatic window glass and the like designed to produce horizontally directed light rays which are adapted to extend down long interiors. Such window glass has extremely high brightness and the illumination is glaring and unnatural.

Figure 11:
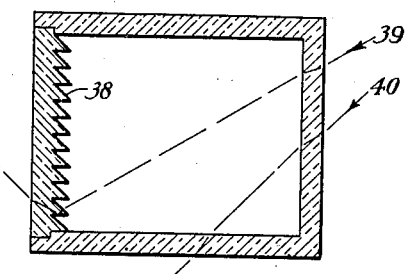
Figs. 10 and 11 are transverse sectional views through bricks employing reflecting prisms on the vertical walls of the brick.
Figure 10:
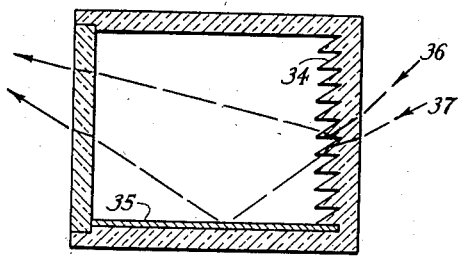

In the constructions above discussed, reflection takes place at the top or bottom wall of the brick, the side walls of the brick transmitting the light without substantial change of direction. Figs. 10 and 11 illustrate bricks in which the inner and outer walls respectively are provided with horizontal prisms 34 and 38 on their inner faces for reflecting light as indicated. In these two illustrations, the bricks are six sided with the cover plate placed at one side. This placement provides a method of pressing brick with horizontal prisms in the side walls. In Fig. 10 the prisms are placed in the side wall away from the cover. This would be the bottom of the brick when it is being pressed. In Fig. 11 the prisms are formed in the cover plate itself. Typical light rays are shown at 36 and 37 of Fig. 10 and 39 and 40 of Fig. 11. In the case of Fig. 10 an additional reflecting surface 35 is placed in the bottom of the brick. This serves to act on light rays such as 37 which miss the reflecting surfaces of the prisms 34. The greatest part of the light, however, is represented by the light ray 36 reflected by the reflecting surfaces of the prisms 34. In Fig. 11, a light ray such as 40, which misses the reflecting prisms 38, would pass into the brick below to be acted on by similar prisms of that brick.

Where it is necessary to provide redirection laterally of the brick wall, some lateral diffusion may be had by employing vertical flutes, prisms, or other diffusing means on the vertical surfaces of the brick. Where the flutes or diffusing means are shallow, the lateral diffusion will be less pronounced, but where more intense lateral diffusion or redirection is desired, deeper prisms will be provided on the vertical surfaces. Such prisms are indicated at 32 in Fig. 9.

It will, of course, be understood that the longitudinal and transverse prisms need not be straight, and that they may be shifted slightly from the angles indicated in the drawings, so as to be oblique to the side or end of the brick.

It is obvious that the invention may be embodied in many forms and constructions within the scope of the claims, and I wish it to be understood that the particular forms shown are but a few of the many forms. Various modifications and changes being possible, I do not otherwise limit myself in any way with respect thereto.

What is claimed is:

1. A building wall composed of rectangular light transmitting bricks having at least one side wall and a substantially horizontal wall, and light reflecting prisms carried by the substantially horizontal wall adapted to receive downwardly slanting light incident on one side of the building wall and reflect it into upwardly slanting directions for transmission in said upwardly slanting directions from the other side of the building wall.

2. A building wall composed of rectangular light transmitting bricks having at least one side wall and a substantially horizontal bottom wall, the bottom wall carrying light reflecting prisms adapted to receive downwardly slanting light incident on one side of the building wall and reflect it upwardly through the opposite side of the building wall.

3. A building wall as claimed in claim 1, wherein the reflecting prisms are transverse prisms placed on the lower surface of the substantially horizontal wall of the brick, the upper surface of said wall carrying longitudinal prisms so disposed so as to increase the amount of light reflected from the transverse prisms.

4. A building wall composed of rectangular light transmitting bricks having at least one side wall and a substantially horizontal top wall, the top wall carrying light reflecting prisms adapted to receive downwardly slanting light incident on one side of the superposed brick and reflect it upwardly through the opposite side of the superposed brick.

5. A pressed brick for constructing light transmitting walls, comprising a hollow, box-like light transmitting body having side and end walls and a bottom wall, the bottom wall having light reflecting prisms to receive light transmitted downwardly through one side wall of the brick and reflect it upwardly toward the other side wall for transmission thereby.

6. A pressed brick for constructing light transmitting walls, comprising a hollow box-like light transmitting body having side and end walls and a bottom wall, the bottom wall having light reflecting prisms to receive light transmitted downwardly through one side wall of the brick and reflect it upwardly toward the other side wall for transmission thereby, said prisms being transverse of the bottom wall and on its lower face.

7. A pressed brick for constructing light transmitting walls, comprising a light transmitting body having side and end walls and a bottom wall, the bottom wall having longitudinal prisms on its upper surface whereby light transmitted downwardly through one side wall and received by the bottom wall of the brick is reflected upwardly toward the other side wall for transmission thereby.

8. A pressed brick for constructing light transmitting walls, comprising a light transmitting body having side and end walls and a bottom wall, the bottom wall having transverse reflecting prisms on its lower surface and longitudinal prisms on its upper surface disposed to increase the average angle of incidence of light transmitted to the transverse prisms whereby light transmitted downwardly through one side wall and received by the bottom wall of the brick is reflected upwardly toward the other side wall for transmission thereby.

9. A brick as claimed in claim 4, wherein the bottom wall is oblique to the side walls and tipped relative to the horizontal so that the reflected light is emitted at a higher angle than the corresponding incident light.

10. A pressed brick for constructing light transmitting walls, comprising an inverted, box-like, light transmitting body of greater length than width adapted for placing in a stretcher course, and having a top wall and dependent side walls and end walls; the top wall having interior transverse light reflecting prisms extending between the side walls to receive downwardly slanting light coming from the above and incident on the top of the brick and reflect it obliquely upward.

11. In a building, a wall composed of light-transmitting box-like bricks assembled in courses, each brick having vertical, substantially transparent side walls externally substantially smooth in vertical planes and adapted to form the inner and outer faces of the building wall, vertical end walls interconnecting the side walls, and at least one transversely extending, substantially horizontal wall, each brick having means within its outer faces for intercepting a large proportion of downwardly slanting sky light incident on the outer face of the building wall and reflecting it into upwardly slanting directions so that it emerges from the inner face of the building wall in said upwardly slanting directions, and a ceiling disposed inwardly of the inner face of the wall to receive said upwardly slanting light and redistribute it downwardly for interior illumination.

12. A building wall as claimed in claim 11, wherein the reflecting means is in the form of prisms.

13. A building wall as claimed in claim 11, wherein the reflecting means is in the form of prisms longitudinal of the brick.

14. A building wall as claimed in claim 11, wherein the reflecting means comprises the substantially horizontal wall of the brick which has longitudinal prisms on the upper surface thereof to increase the amount of light reflected from the lower surface thereof.

15. A building wall as claimed in claim 11, wherein the reflecting means is in the form of prisms transverse of the horizontal wall of the brick.

16. A building wall as claimed in claim 11, wherein the reflecting means is in the form of a substantially horizontal reflector.

THOMAS W. ROLPH.